(No Model.)

W. S. KISINGER & H. G. STIEBEL, Jr.
WATER SPRINKLER.

No. 420,879. Patented Feb. 4, 1890.

Attest.
S. S. Carpenter
L. E. Layman

Inventors.
William S. Kisinger.
Henry G. Stiebel, Jr.
by James T. Layman
Atty.

UNITED STATES PATENT OFFICE.

WILLIAM S. KISINGER, OF BELLEVUE, KENTUCKY, AND HENRY G. STIEBEL, JR., OF CINCINNATI, OHIO, ASSIGNORS TO HENRY G. STIEBEL, OF CINCINNATI, OHIO.

WATER-SPRINKLER.

SPECIFICATION forming part of Letters Patent No. 420,879, dated February 4, 1890.

Application filed July 6, 1889. Serial No. 316,699. (No model.)

*To all whom it may concern:*

Be it known that we, WILLIAM S. KISINGER, a citizen of the United States, residing at Bellevue, in the county of Campbell and State of Kentucky, and HENRY G. STIEBEL, Jr., a citizen of the United States, residing at Cincinnati, in the county of Hamilton and State of Ohio, have invented certain new and useful Improvements in Water-Sprinklers; and we do declare the following to be a full, clear, and exact description of the invention, reference being had to the accompanying drawings, which form a part of this specification.

The first part of our improvements consists in forming a water-sprinkler of a plate or disk whose upper surface is armed with a series of peculiarly-shaped vanes or flanges that disperse the water by the centrifugal velocity of the machine. These vanes are usually arranged tangentially upon the disk, converge from their outer to their inner ends, and are concave in front, or, in other words, on the side that first comes in contact with the stream of water discharged from the tank or other reservoir, the invention being more especially applicable to wagons for sprinkling streets, roads, &c., as hereinafter more fully described.

The second part of our improvements consists in securing coiled wires or rods on the upper surface of the disk between the vanes or flanges. These coiled wires are preferably radial upon said disk and serve to break up the thin stratum of water before it is scooped up by the concave vanes, as hereinafter more fully described.

Figure 1:
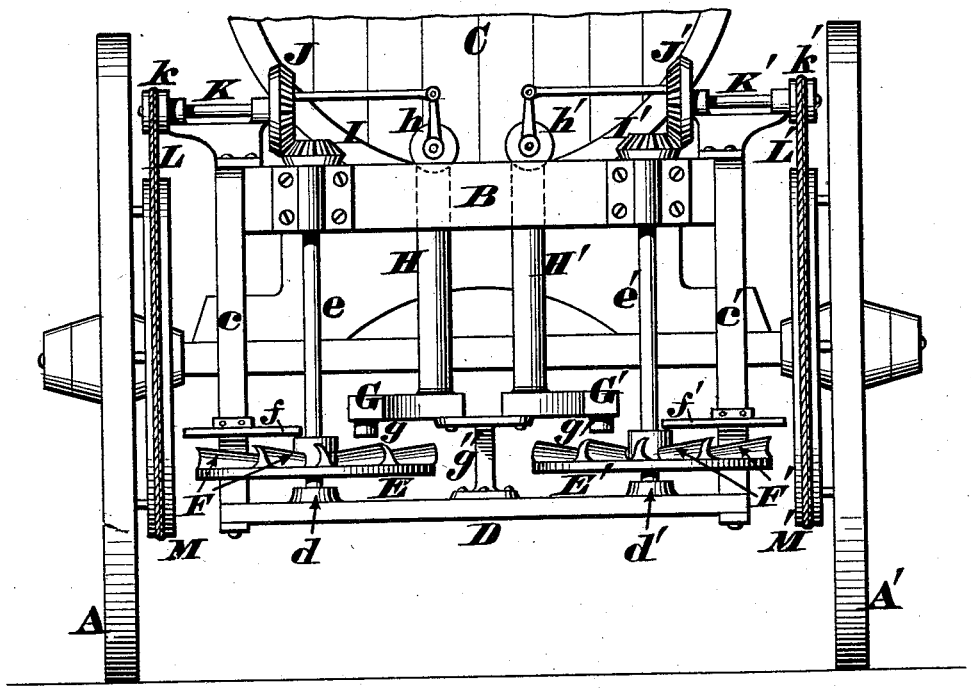
Figure 2:
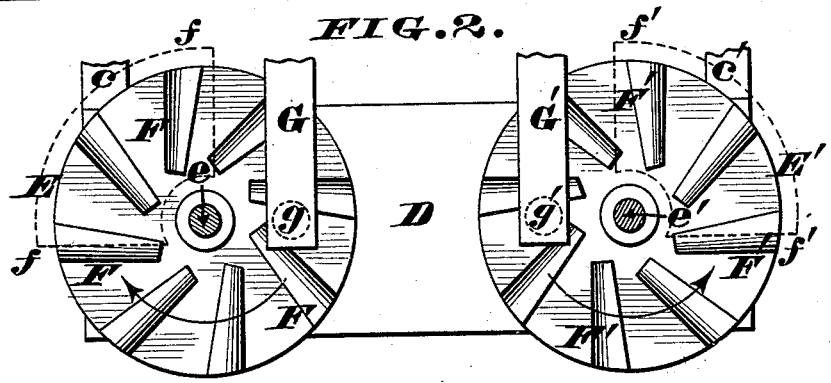
Figure 3:
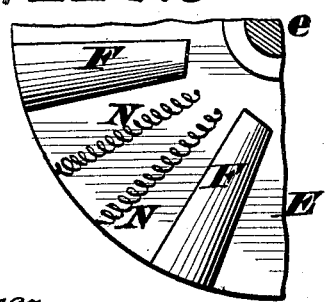
Figure 4:
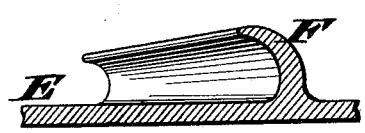

In the annexed drawings, Figure 1 is a rear elevation of a watering cart or wagon provided with a pair of our improved sprinklers. Fig. 2 is an enlarged plan of said sprinklers. Fig. 3 is a plan of a portion of a sprinkler to which the coiled wires are applied. Fig. 4 is an enlarged vertical section through a vane and a portion of the disk.

Referring to Fig. 1, A A' represent the rear wheels, B the main frame, and C the tank, barrel, or other reservoir, of an ordinary street-sprinkling wagon of any approved construction.

Depending from the frame C are hangers $c$, $c'$ that support a platform D, having a pair of steps or bearings $d$ $d'$ for vertical shafts $e$ $e'$, which latter are either cast with or rigidly attached to plates or disks E E', the disk form being preferred for obvious reasons. The upper surface of disk E is armed with a series of vanes or flanges F, which may be integral with said disk, or they may be secured thereto in any convenient manner. It is preferred, however, to arrange the vanes so that they will be tangential upon the disk, and to taper or converge them uniformly toward their inner ends. Furthermore, the front or leading surfaces of these vanes must be concave; but their rear or trailing surfaces may be of any desired shape.

F' are the similarly-shaped vanes of the other disk E'.

$f f'$ are shields attached to the hangers $c$ $c'$ and applied directly above the disks, which shields prevent a too great vertical dispersion of the jets at the sides of the wagon, said shields extending about one-fourth around said disks, as indicated by the dotted lines in Fig. 2.

$g g'$ are ventages or nozzles that furnish the sprinklers with water, said ventages being located at the bottom of conductors G G', which receive their supply from pipes H H' leading up to the tank, said pipes being furnished with valves or cocks $h h'$ for regulating the flow. $g''$ is a prop that supports the conductors G G'.

A high velocity can be imparted to the disks by any suitable means; but we prefer to attach a bevel-wheel I to the upper end of shaft $e$ and gear the former with another bevel-wheel J on the counter-shaft K, to which a pulley $k$ is secured.

L is a band or chain passing around this pulley and around a large pulley or other driver M attached to the inner side of ground-wheel A. The other shaft $e'$ is driven by a precisely-similar arrangement of devices, as seen at I', J,' K', $k'$, L', and M', the driver M' being secured to the inner side of ground-wheel A'.

When the wagon is in operation, the valves $h h'$ are opened to permit the water to escape through the ventages $g$ $g'$ and fall directly upon the disks E E', which are driven at a high velocity on account of the manner in which they are geared to the rear wheels of the vehicle. The water is instantly scooped up by the concave vanes F F', which, being of greater capacity at their outer than at their inner ends, tend to deflect or throw the water away from the axis of the disks, which deflection is materially increased by the ordinary centrifugal action of said disks. Consequently the water is thrown to a considerable horizontal distance in the form of finely-divided jets or spray, the two disks being run in the direction of the arrows seen in Fig. 2. In some cases we provide the disk with one or more coiled wires or rods, as seen at N N in Fig. 3, which coils are arranged between the vanes F and may be either radial or tangential. The coils are secured at their ends and their numerous convolutions break up the thin stratum of water on the disk before the vanes begin their action. Therefore, the coils and vanes coact in causing a thorough and uniform dispersion of the water and prevent it falling in heavy sheets, as our machine is designed to sprinkle the dust and not to convert it into mud.

We are aware that it is not new to provide a revolving valve with a series of vanes or buckets and journal it to a nozzle in order that a stream of water escaping from the latter may impinge against said vanes and thereby set the valve in motion, as such an automatic distributer is seen in Letters Patent No. 347,033, granted August 10, 1886, to A. M. Granger. Therefore, we expressly disclaim the device seen in said patent, or any other form of distributer that is automatically driven by a jet of water, and limit our invention to the within-described centrifugal sprinkler when operated by some extraneous power—such, for example, as by geared connections with the ground-wheels of a watering-cart, &c.

We claim as our invention—

1. A centrifugal sprinkler consisting of a plate or disk whose upper surface is provided with a series of concave vanes or buckets which are open at their outer ends and have their concave sides presented in the direction said disk turns, said sprinkler being driven by connections with an extraneous motor, in order that a stream of water delivered upon said disk may be scooped up by said buckets and discharged at their open ends in finely-divided jets or spray, substantially as described.

2. A power-driven centrifugal sprinkler consisting of a plate or disk armed with a series of vanes or buckets which are concave in transverse section and arranged tangentially to a circle of less diameter than said disk, as herein described, and for the purpose stated.

3. A centrifugal sprinkler consisting of a plate or disk whose upper surface is provided with a series of concave vanes or buckets which are open at their outer ends and have their concave sides presented in the direction said disk turns, and being tapered from their outer to their inner ends, said sprinkler being driven by connections with an extraneous motor, in order that a stream of water delivered upon said disk may be scooped up by said buckets and discharged at their open ends in finely-divided jets or spray, substantially as described.

4. A centrifugal sprinkler having a series of concave vanes with one or more spiral coils between them, for the purpose described.

In testimony whereof we affix our signatures in presence of two witnesses.

WILLIAM S. KISINGER.
HENRY G. STIEBEL, JR.

Witnesses:
JAMES H. LAYMAN,
SAML. S. CARPENTER.